T. J. GORMAN, Sr.
OVERSHOE FOR HORSES.
APPLICATION FILED DEC. 28, 1911.

1,028,709.

Patented June 4, 1912.

WITNESSES
Robert M. Sutphen
L. N. Gillis

INVENTOR
Thomas J. Gorman Sr.
By E. E. Vrooman, his Attorney.

COLUMBIA PLANOGRAPH CO., WASHINGTON, D. C.

UNITED STATES PATENT OFFICE.

THOMAS J. GORMAN, SR., OF HUDSON HEIGHTS, NEW JERSEY.

OVERSHOE FOR HORSES.

1,028,709.  Specification of Letters Patent.  Patented June 4, 1912.

Application filed December 28, 1911. Serial No. 668,368.

*To all whom it may concern:*

Be it known that I, THOMAS J. GORMAN, Sr., citizen of the United States, residing at Hudson Heights, in the county of Hudson and State of New Jersey, have invented certain new and useful Improvements in Overshoes for Horses, of which the following is a specification, reference being had therein to the accompanying drawing.

This invention relates to over-shoes for horses of a type which is provided with anti-slipping means.

The principal object of the invention is to improve and simplify the general construction of such over-shoes.

A second object of the invention is to provide improved means for fastening over-shoes on horses so that all metallic links will be kept from contact with the upper part of the hoof and permit the device to be semi-rigid.

Figure 1:
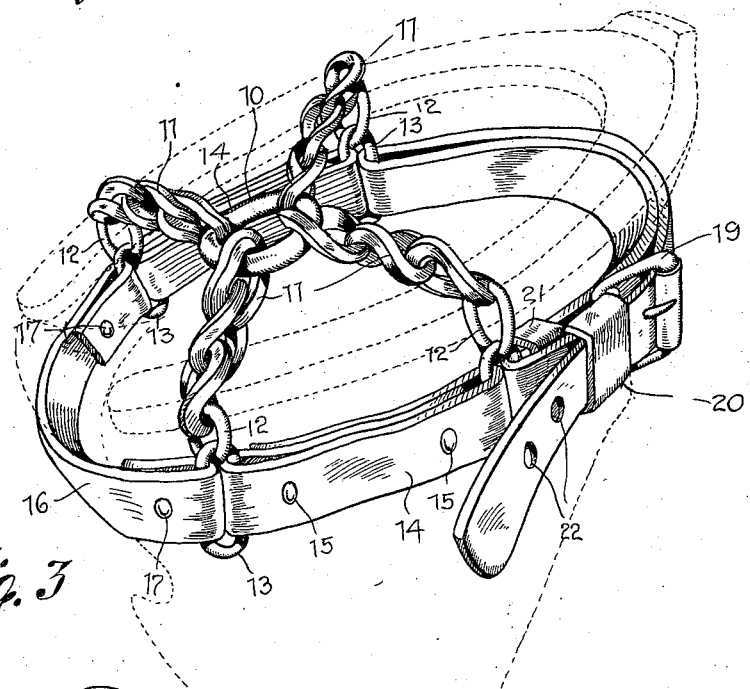
Figure 2:
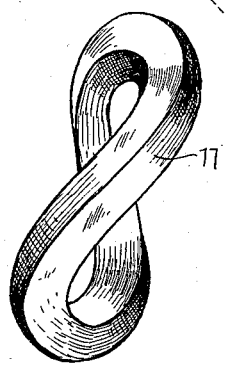
Figure 2:
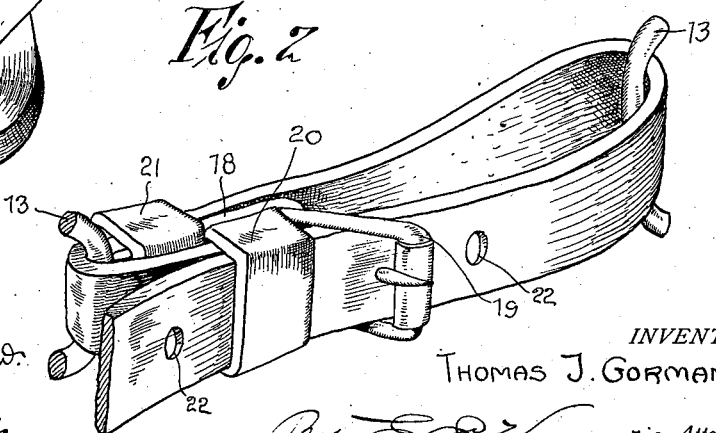

In the accompanying drawings, like characters of reference indicate like parts in the several views, and: Figure 1 is a perspective view showing a horse's hoof upturned in dotted lines and the over-shoe applied thereto. Fig. 2 is a perspective view showing the strap by means of which the device is adjusted in position on the horse's hoof. Fig. 3 is a perspective view of one of the anti-slipping links used in connection herewith.

The invention consists of a centrally disposed circular link 10 whereto are connected four chains, each consisting of links 11 which are square in cross section and twisted a quarter of a turn so that a sharp edge will always be presented to the pavement or roadway over which the horse is passing. At the end of each of the chains there is provided an oval-link 12 which is preferably circular in cross section and to which is connected a link 13 having parallel sides and rounded ends. These chains are intended to extend from opposite parts of the link 10, and the chains are arranged in pairs to extend each over a respective side of the hoof. The links 13 of each pair of chains are connected together by a heavy leather strap 14 which is passed through each of the links 13 and has its ends overlapping and extending past each other for nearly the full distance between said links 13. These ends are firmly held in position by rivets 15 which pass through all three thicknesses of the strap which is formed as can clearly be seen by reference to Fig. 1. By means of this construction a semi-rigid connection is made between the links 13 of each pair. These straps 14 lie on the side of the hoof and passing around the rear of the hoof to connect the rear links 13 is a single thickness strap 16 which has its ends passed through the respective links 13 and doubled back a short distance on the body, being there held by rivets 17. This strap therefore is flexible so that it may readily fit around the rear part of the hoof. Connecting the front links 13 is an adjustable strap and this strap has one end passed through one of the links 13 and doubled around as indicated at 18 to hold a buckle 19 of the ordinary construction. Between the link 13 just referred to and the buckle 19 is a keeper 20 formed from a piece of leather and engaging the end of the strap 18 is a second keeper 21 similarly constructed. The strap is then passed through the remaining link 13 and brought back through the buckle, being adjusted therein by means of the usual holes or openings 22 and the free end passed through the keeper 20. This strap is also preferably flexible to readily conform to the contour of the front of the hoof and also to prevent injury to the horse's foot when wearing the device.

By reason of the semi-rigid construction of the side straps 14 the device may be readily applied without danger of tangling and when so applied may be tightened up to the proper degree by means of the adjustable strap.

There has thus been provided a simple and efficient device of the kind described and for the purpose specified.

Having thus described the invention, what is claimed as new, is:—

In a device of the kind described, a centrally disposed circular link, chains connected to said link and radiating from spaced portions thereof, said chains each terminating in a link having rounded ends and parallel sides, said terminal links being arranged in pairs adapted to lie on either side of a horse's hoof, a leather strap connecting each pair of the terminal links and having its ends overlapping to provide three thicknesses of leather, rivets extending through said strap to hold the ends and body together and thereby provide a semi-rigid connection between said links, a leather strap adapted to fit over the rear of a horse's hoof connecting the rear terminal links, and a leather strap having one end connected to one of the front terminal links and passing through the other front terminal link, said last mentioned strap being provided with openings and a buckle for adjustment.

In testimony whereof I hereunto affix my signature in presence of two witnesses.

THOMAS J. GORMAN, Sr.

Witnesses:
    WILLIAM W. SAGERTON,
    THOMAS J. GORMAN, Jr.

Copies of this patent may be obtained for five cents each, by addressing the "Commissioner of Patents, Washington, D. C."